(12) United States Patent
Moritz et al.

(10) Patent No.: US 11,100,920 B2
(45) Date of Patent: Aug. 24, 2021

(54) SYSTEM AND METHOD FOR END-TO-END SPEECH RECOGNITION WITH TRIGGERED ATTENTION

(71) Applicant: Mitsubishi Electric Research Laboratories, Inc., Cambridge, MA (US)

(72) Inventors: Niko Moritz, Allston, MA (US); Takaaki Hori, Lexington, MA (US); Jonathan Le Roux, Arlington, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 144 days.

(21) Appl. No.: 16/363,021

(22) Filed: Mar. 25, 2019

(65) Prior Publication Data

US 2020/0312306 A1 Oct. 1, 2020

(51) Int. Cl.
*G10L 15/00* (2013.01)
*G10L 15/16* (2006.01)
*G10L 15/22* (2006.01)
*G10L 19/00* (2013.01)
*G10L 15/02* (2006.01)
(Continued)

(52) U.S. Cl.
CPC .............. *G10L 15/16* (2013.01); *G10L 15/02* (2013.01); *G10L 15/22* (2013.01); *G10L 19/00* (2013.01); *G06N 3/02* (2013.01); *G10L 15/08* (2013.01); *G10L 25/30* (2013.01)

(58) Field of Classification Search
None
See application file for complete search history.

(56) References Cited

U.S. PATENT DOCUMENTS 9,786,270 B2 * 10/2017 Senior .................. G10L 15/063
9,990,918 B1    5/2018 Chan et al.
(Continued)

OTHER PUBLICATIONS

Luong, M.-T., Pham, H., and Manning, C. D. Effective approaches to attention-based neural machine translation. In Conference on Empirical Methods in Natural Language Processing (2015).*
(Continued)

*Primary Examiner* — Richard Z Zhu
(74) *Attorney, Agent, or Firm* — Gennadiy Vinokur; Hironori Tsukamoto

(57) ABSTRACT

A speech recognition system includes an encoder to convert an input acoustic signal into a sequence of encoder states, an alignment decoder to identify locations of encoder states in the sequence of encoder states that encode transcription outputs, a partition module to partition the sequence of encoder states into a set of partitions based on the locations of the identified encoder states, and an attention-based decoder to determine the transcription outputs for each partition of encoder states submitted to the attention-based decoder as an input. Upon receiving the acoustic signal, the system uses the encoder to produce the sequence of encoder states, partitions the sequence of encoder states into the set of partitions based on the locations of the encoder states identified by the alignment decoder, and submits the set of partitions sequentially into the attention-based decoder to produce a transcription output for each of the submitted partitions.

15 Claims, 11 Drawing Sheets

(51) Int. Cl.
*G10L 15/08* (2006.01)
*G10L 25/30* (2013.01)
*G06N 3/02* (2006.01)

(56) References Cited

U.S. PATENT DOCUMENTS

| | | | |
|---|---|---|---|
| 10,210,860 B1* | 2/2019 | Ward | G10L 15/30 |
| 2018/0247639 A1* | 8/2018 | Liu | G10L 15/04 |
| 2020/0027444 A1* | 1/2020 | Prabhavalkar | G10L 15/16 |
| 2020/0126538 A1* | 4/2020 | Han | G10L 15/063 |

OTHER PUBLICATIONS

D. Bahdanau, J. Chorowski, D. Serdyuk, P. Brakel, and Y. Bengio, "End-to-end attention-based large vocabulary speech recognition," in Http://arxiv.org/abs/1508.04395, 2015.*

Moritz et al. Triggered Attention for End to End Speech Recognition., ICASSP 2019, IEEE International Conference on Accoustics, Speech and Signal Processing, IEEE, May 12, 2019. pp. 5666-5670.

* cited by examiner

SYSTEM AND METHOD FOR END-TO-END SPEECH RECOGNITION WITH TRIGGERED ATTENTION

TECHNICAL FIELD

This invention generally relates to a system and a method for speech recognition, and more specifically to a method and system for end-to-end speech recognition.

BACKGROUND

Automatic speech recognition (ASR) systems are widely deployed for various interface applications such as voice search. However, it is challenging to make a speech recognition system that achieves a high recognition accuracy. This is because such a making requires deep linguistic knowledge on the target language that the ASR system accepts. For example, a set of phonemes, a vocabulary, and a pronunciation lexicon are indispensable for making such an ASR system. The phoneme set needs to be carefully defined by linguists of the language. The pronunciation lexicon needs to be created manually by assigning one or more phoneme sequences to each word in the vocabulary including over 100 thousand words. Moreover, some languages do not explicitly have a word boundary and therefore we may need tokenization to create the vocabulary from a text corpus. Consequently, it is quite difficult to develop speech recognition systems especially for minor languages. The other problem is that a speech recognition system is factorized into several modules including acoustic, lexicon, and language models, which are optimized separately. This architecture may result in local optima, although each model is trained to match the other models.

End-to-end and sequence-to-sequence neural network models, respectively, have recently gained increased interest and popularity in the ASR community. The output of an end-to-end ASR system is usually a grapheme sequence that can either be single letters or larger units such as word-pieces and entire words. The appeal of end-to-end ASR is that it enables a simplified system architecture compared to traditional ASR systems by being composed of neural network components and avoiding the need for linguistic expert knowledge to build ASR systems. End-to-end ASR systems can learn all the components of a speech recognizer including the pronunciation, acoustic and language model directly, which avoids the need of language specific linguistic information and text normalization.

End-to-end speech recognition has the goal of simplifying the conventional architecture into single neural network architecture within a deep learning framework. For example, some end-to-end ASR systems use attention-based neural networks introduced by Chan et al. of Carnegie Mellon University and Google Brain and Bandanau et al. of the Jacobs University Bremen and University of Montreal in 2015. Attention-based neural networks, see, e.g., U.S. Pat. No. 9,990,918, show state-of-the-art results in end-to-end speech recognition. However, the attention-based neural networks have output delays and are less applicable to online/streaming ASR, where low delays are required.

Accordingly, there is a need to reduce output delays induced by such attention based model architectures for end-to-end and/or sequence-to-sequence speech recognition.

SUMMARY

Automatic speech recognition (ASR) can be regarded as a sequence-to-sequence problem, in which the input is a sequence of acoustic features extracted from audio frames at a certain rate and the output is a sequence of characters. It is an object of some embodiments to improve performance of an attention-based network for end-to-end and/or sequence-to-sequence speech recognition. Additionally, or alternatively, it is another object of some embodiments to reduce output delays induced by attention-based model architectures and to adapt end-to-end attention-based ASR systems for recognition in a streaming/online fashion.

Some embodiments are based on recognition that the attention-based ASR systems need to observe an input sequence, which is typically an entire speech utterance segmented by speech pauses, to assign a weight to each input frame in order to recognize each transcription output of an output sequence. For example, transcription outputs may include single alphabetic characters or a sequence of characters such as word or sentence pieces. Due to the absence of a priori knowledge about which parts of an input sequence are relevant to recognize the next transcription output and the need to assign a weight to each input frame, the attention-based network usually needs to process large input sequences. Such a processing allows to take advantage of placing attention to different parts of the utterance but also increases output delays, and thus is not practical for speech recognition in a streaming/online fashion.

As used herein, an output delay of ASR is a difference between time of receiving acoustic frames of a speech utterance and time of recognizing the received acoustic frames. For example, when the attention-based ASR system operates on the entire speech utterance, the recognition of the words in the utterance is delayed until the last audio samples of the utterance are received. Such a delay of recognition causes the increased output delays.

Some embodiments are based on realization that an example of the a priori knowledge about relevancy of different parts of an input sequence to recognition of the next transcription output is an indication of locations of frames corresponding to the transcription piece to be recognized in the input sequence. Indeed, if the transcription piece locations are known, the attention-based network can be constrained to place greater attention to the area around them by restricting the input sequence. In such a manner, for each transcription output, the attention-based network can focus its attention to an area around the assumed location of that transcription piece in the input sequence. This guided attention reduces the need to process large input sequences, which in turn reduces the output delays making the attention-based network practical for recognition in a streaming/online fashion.

Hence, there is a need to determine a location alignment of the input to the attention-based network with the output of the attention-based network to reduce output delays. Unfortunately, however, for ASR applications this alignment is far from being straightforward due to irregularity of human pronunciations. For example, speed of pronunciation can vary even within a single utterance introducing different numbers of silence segments between different words of the same utterance or even between different characters of a single word. In addition, most attention-based systems first transform input features, such as acoustic features, by an encoder network into a different representation referred herein as encoder states. To that end, the desired alignment is performed on encoded states rather than the input acoustic features.

Some embodiments are based on recognition that there is a need to provide an alignment network trained to determine locations of encoder states that encode transcription outputs, such as characters, bits, words, etc. For example, a connectionist temporal classification (CTC) is a type of neural network output and associated scoring function, for training recurrent neural networks (RNNs) such as long short-term memory (LSTM) networks to tackle sequence problems where the timing is variable. A CTC-based ASR system is an alternative to an attention-based ASR system. A CTC-based neural network generates an output for each frame of the input sequence, i.e. in- and outputs are synchronized, and a beam search algorithm is used to collapse neural network outputs to the output transcription. The performance of attention-based ASR systems may be superior to CTC-based ASR systems. However, some embodiments are based on realization that the in- and output frame alignment used by intermediate operations of the CTC-based ASR system can be used by an attention-based ASR system to address its output delay drawbacks mentioned above.

Additionally, or alternatively, some embodiments are based on realization that a hidden Markov model based (HMM-based) system can provide a desired alignment. Specifically, traditional HMM-based ASR systems such as hybrid deep neural network (DNN) or Gaussian Mixture Model (GMM) based HMM models can be used to compute the alignment information.

Accordingly, one embodiment discloses a speech recognition system trained to produce a transcription of the utterance from an acoustic signal. The speech recognition system includes an encoder network configured to process the acoustic signal to produce an encoded acoustic signal including a sequence of encoder states; an alignment network, such as a connectionist temporal classification based (CTC-based) neural network and/or HMM-based model, configured to process the sequence of encoder states to produce an alignment of the transcription outputs to identify the location of encoder states that encode the most relevant information to generate the transcription outputs; and an attention-based neural network configured to determine a representation of the transcription of the utterance from subsequence of the encoder states.

To that end, the speech recognition system submits the received acoustic signal into the encoder network to produce the sequence of encoder states; submits the sequence of encoder states into the alignment network to identify locations of encoder states that encode the transcription outputs in the sequence of encoder states; partitions the sequence of encoder states into a set of partitions based on the locations of the identified encoder states; and submits the set of partitions sequentially into the attention-based neural network to produce a transcription output for each of the submitted partitions. Due to such a sequential processing of partitions including transcription outputs, the attention-based network adapts end-to-end attention-based ASR systems for recognition in a streaming/online fashion.

In some implementations, the encoder, the alignment decoder and the attention-based decoder are neural networks suitable for joint training. Notably, the alignment decoder, such as CTC-based neural network, can also operate not on the original acoustic feature frames, but on encoder states produced by the encoder. Hence, the CTC-based neural network can be trained for the same encoder used to train the attention-based neural network to produce the alignment for the encoder states provided to the attention-based neural network as an input. The alignment produced by the CTC-based neural network indicates locations of frames in the sequence of frames of the encoded acoustic signal that encode outputs of the transcription of the utterance. Because of this alignment, the attention-based neural network can use this a priori knowledge as anchor points to find a sequence of input frames that include sufficient information to recognize the next transcription output. In turn, such an alignment allows reducing transcription errors, reducing computational complexity and/or adapting the attention-based network for speech recognition in a streaming/online fashion.

Another problem addressed by various embodiments is how to use alignment of the locations to condition the attention of the attention-based decoder in an efficient manner. For example, one embodiment modifies the structure of the attention-based decoder to accept the locations of the transcription pieces as side information and train the attention-based neural network to use this side information in placing the attention. Another embodiment partitions the input to the attention-based neural network based on location of the next transcription output that was detected by an alignment decoder. Such a partitioning forces the attention-based decoder to place attention only on desired input frames. In addition, this partitioning allows reducing the need to wait until receiving future input frames up to the end of the utterance, which reduces the output delays.

For example, in some embodiments, the ASR system partitions the sequence of encoder states representing the encoded acoustic signal according to the indicated locations. Such partitions of the encoded acoustic signal are iteratively processed by the attention-based decoder to produce the transcription of the utterance. In such a manner, different iterations process different parts of the entire input signal. This allows processing the input acoustic signal in a streaming/online fashion.

For example, in one embodiment an iteration of the attention-based decoder starts from an internal state resulted from a previous iteration to process a partition different from the partition processed during the previous iteration. Hence, the internal state of the attention-based neural network is preserved not only for processing characters of the same input sequence of frames, but also for processing characters of different input sequences of frames. In such a manner, the attention-based decoder forwards its internal state for processing different portions, i.e., different sequences of frames. This differentiation allows the attention-based model to focus its attention on different portions of the utterance to reduce errors caused by, e.g., deletion/skipping of transcription outputs.

For example, in one implementation, each partition corresponds to a location identified by the CTC-based neural network to include a portion of the sequence of frames from the beginning of the sequence until some look-ahead frames. Such a partition incrementally adds new information to the sequence of input frames while preserving previously processed information. In effect, such a partition follows the principles of attention-based model allowing processing of the same portions of the utterance multiple times and using the weights to prioritize attention to different portions of the utterance. However, because the previous portion has been already decoded, and the added new portion corresponds to a new transcription output to be decoded, the attention-based model can increase the focus on the newly added frames to increase the accuracy of decoding.

Additionally, or alternatively, some embodiments restrict not only the processing of future input frames, but also the number of past frames to be processed by the attention-based decoder. For example, one embodiment partitions the encoded acoustic frames such that each partition includes a subsequence of the sequence of frames with a fixed number of frames. The partitioning is performed according to the location identified by the alignment decoder to include a frame at the identified location in the subsequence of frames. For example, the subsequence of frames can be centered on the frame at the corresponding identified location and/or include a subsequence of frames around the frame at the identified location. This embodiment reduces the size of the partitions processed by the attention-based neural network to reduce the computational complexity.

In some embodiments, the encoder neural network, the CTC-based neural network, and the attention-based neural network are jointly trained to form the triggered attention (TA) neural network. In such a manner, the CTC-based neural network and the attention-based neural network are trained from the output of the same encoder neural network. This increases accuracy of cooperation between different components of the TA network and allows training the TA network in an end-to-end fashion to produce an end-to-end ASR system.

Accordingly, one embodiment discloses a speech recognition system, including a computer memory configured to store an encoder configured to convert an input acoustic signal into a sequence of encoder states; an alignment decoder configured to identify locations of encoder states in the sequence of encoder states that encode transcription outputs; a partition module configured to partition the sequence of encoder states into a set of partitions based on the locations of the identified encoder states; and an attention-based decoder configured to determine the transcription outputs for each partition of encoder states submitted to the attention-based decoder as an input; an input interface configured to receive the acoustic signal representing at least a portion of a speech utterance; a hardware processor configured to submit the received acoustic signal to the encoder to produce the sequence of encoder states; submit the sequence of encoder states into the alignment decoder to identify locations of the encoder states that encode the transcription outputs; partition the sequence of encoder states, using the partition module, into the set of partitions based on the locations of the identified encoder states; and submit the set of partitions sequentially into the attention-based decoder to produce a transcription output for each of the submitted partitions; and an output interface configured to output the transcription outputs.

Another embodiment discloses a speech recognition method, wherein the method uses a processor coupled with stored instructions implementing the method, wherein the instructions, when executed by the processor, carry out steps of the method, which includes receiving an acoustic signal representing at least a portion of a speech utterance; converting the acoustic signal into a sequence of encoder states; identifying locations of encoder states in the sequence of encoder states that encode transcription outputs; partitioning the sequence of encoder states into a set of partitions based on the locations of the identified encoder states; submitting the set of partitions sequentially into an attention-based decoder to produce a transcription output for each of the submitted partitions; and outputting the transcription outputs.

Yet another embodiment discloses a non-transitory computer readable storage medium embodied thereon a program executable by a processor for performing a method. The method includes receiving an acoustic signal representing at least a portion of a speech utterance; converting the acoustic signal into a sequence of encoder states; identifying locations of encoder states in the sequence of encoder states that encode transcription outputs; partitioning the sequence of encoder states into a set of partitions based on the locations of the identified encoder states; submitting the set of partitions sequentially into an attention-based decoder to produce a transcription output for each of the submitted partitions; and outputting the transcription outputs.

DETAILED DESCRIPTION

Figure 1:
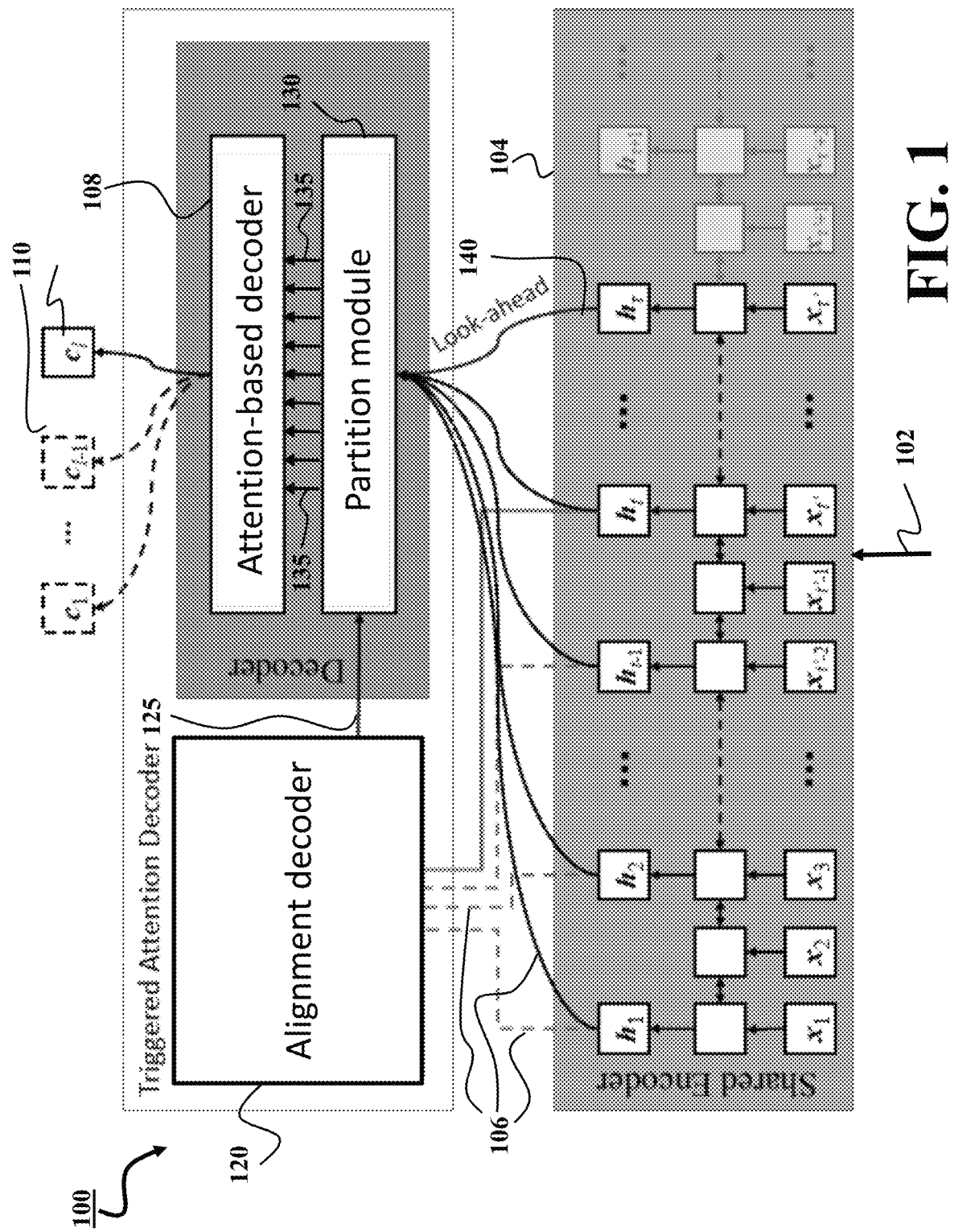
FIG. 1 shows a schematic of a speech recognition system (ASR) configured for end-to-end speech recognition according to some embodiments.

FIG. 1 shows a schematic of a speech recognition system (ASR) 100 configured for end-to-end speech recognition according to some embodiments. The speech recognition system 100 obtains input acoustic sequences and processes the input acoustic sequences to generate transcription output sequences. Each transcription output sequence is a transcription of the utterance or a portion of utterance represented by the corresponding input acoustic signal. For example, the speech recognition system 100 can obtain an input acoustic signal 102 and generate a corresponding transcription output 110 that is a transcription of the utterance represented by the input acoustic signal 102.

The input acoustic signal 102 may include a sequence of multiple frames of audio data that is a digital representation of an utterance, e.g., a continuous stream of data. The sequence of multiple frames of audio data may correspond to a sequence of time steps, e.g., where each frame of audio data is associated with 25 milliseconds of audio stream data shifted 10 milliseconds further in time from the previous frame of audio data. Each frame of audio data in the sequence of multiple frames of audio data may include feature values for the frame that characterize the portion of the utterance at the corresponding time step. For example, the sequence of multiple frames of audio data may include filter bank spectra feature vectors.

The transcription output 110 may include a sequence of transcription pieces of the utterance represented by the input acoustic signal 102. A transcription output may include one or more characters. For example, a transcription output may be a character or a sequence of characters from a Unicode character set. For example, the character set may include the alphabet of English, Asian, Cyrillic as well as Arabic languages. The character set may also include Arabic numerals, a space character, and punctuation marks. Additionally, or alternatively, a transcription output can include bits, words, and other linguistic constructions.

The speech recognition system 100 includes an acoustic encoder 104 and an attention-based decoder 108. The acoustic encoder 104 processes the input acoustic signal 102 and generates a sequence of encoder states 106 providing alternative, e.g., higher, representations for the input acoustic signal 102. The sequence of encoder states may include an alternative sequence of multiple frames of audio data that correspond to a second set of time steps. In some implementations, the alternative representation for the input acoustic sequence is subsampled to a lower frame rate, i.e., the second set of time steps in the alternative representation is smaller than the first set of time steps in the input acoustic sequence. The attention-based decoder 108 is trained to process encoder states 106 representing alternative representations for the input acoustic signal 102 and generate transcription outputs 110 from the sequence of encoder states provided to the attention-based decoder 108.

Some embodiments are based on recognition that an attention-based ASR system may need to observe an entire speech utterance segmented by speech pauses, to assign a weight to each input frame in order to recognize each transcription output 110. Due to the absence of a priori knowledge about which part of an input acoustic signal is relevant to recognize the next transcription output and the need to assign a weight to each encoder state, the attention-based decoder usually needs to process large input sequences. Such a processing allows taking advantage of placing attention to different parts of the utterance but also increases output delays, and thus is not practical for speech recognition in a streaming/online fashion.

As used herein, an output delay of ASR is a difference between time of receiving acoustic frames of a speech utterance and time of recognizing the received acoustic frames. For example, when the attention-based ASR system operates on the entire speech utterance, the recognition of the words in the utterance is delayed until the last word of the utterance is received. Such a delay of recognition causes the increased output delays.

Some embodiments are based on realization that an example of the a priori knowledge about relevancy of different parts of an input sequence to recognition of the next transcription output is an indication of locations of frames corresponding to the transcription outputs to be recognized in the input sequence. Indeed, if the transcription output locations are known, the attention-based decoder can be forced to place greater attention to these locations and less or no attention to other locations by restricting the input sequence. In such a manner, for each transcription output, the attention-based network can focus its attention around its location in the input sequence. This guided attention reduces the need to process large input sequences, which in turn reduces the output delays making the attention-based decoder practical for recognition in a streaming/online fashion.

To that end, the ASR 100 includes an alignment decoder 120 trained to determine locations 125 of encoder states in the sequence 106 that encode transcription outputs, such as characters, bits, words, etc. For example, a connectionist temporal classification (CTC) is a type of objective function and associated neural network output for training recurrent neural networks (RNNs) such as long short-term memory (LSTM) networks to tackle sequence problems where the timing is variable. A CTC-based ASR system is an alternative to an attention-based ASR system. A CTC-based neural network generates an output for each frame of the input sequence, i.e., in- and outputs are synchronized, and a beam search algorithm is used to find the best output sequence before collapsing neural network outputs to an output transcription. The performance of attention-based ASR systems may be superior to CTC-based ASR systems. However, some embodiments are based on realization that the in- and output frame alignment used by intermediate operations of the CTC-based ASR system can be used by an attention-based ASR system to address its output delay drawbacks mentioned above.

To take advantage from the alignment information 125 provided by alignment decoder 120, the ASR system 100 includes a partition module 130 configured to partition the sequence of encoder states 106 into a set of partitions 135. For example, the partition module 130 can partition the sequence of encoder states for each location 125 of the identified encoder states, such that the number of partitions 135 is defined by, e.g., equal to, the number of the identified encoder states 125 that encode transcription outputs. In such a manner, the attention-based decoder accepts as an input not the entire sequence 106, but portions of that sequence 135, while each portion is likely to include a new transcription output to form the transcription output sequence 110. In some implementations, the combination of alignment decoder, attention-based decoder and the partition module is referred to as triggered attention decoder. In effect, the triggered attention decoder can process the portion of the utterance as it is received making the ASR system 100 practical for recognition in a streaming/online fashion.

Figure 2A:
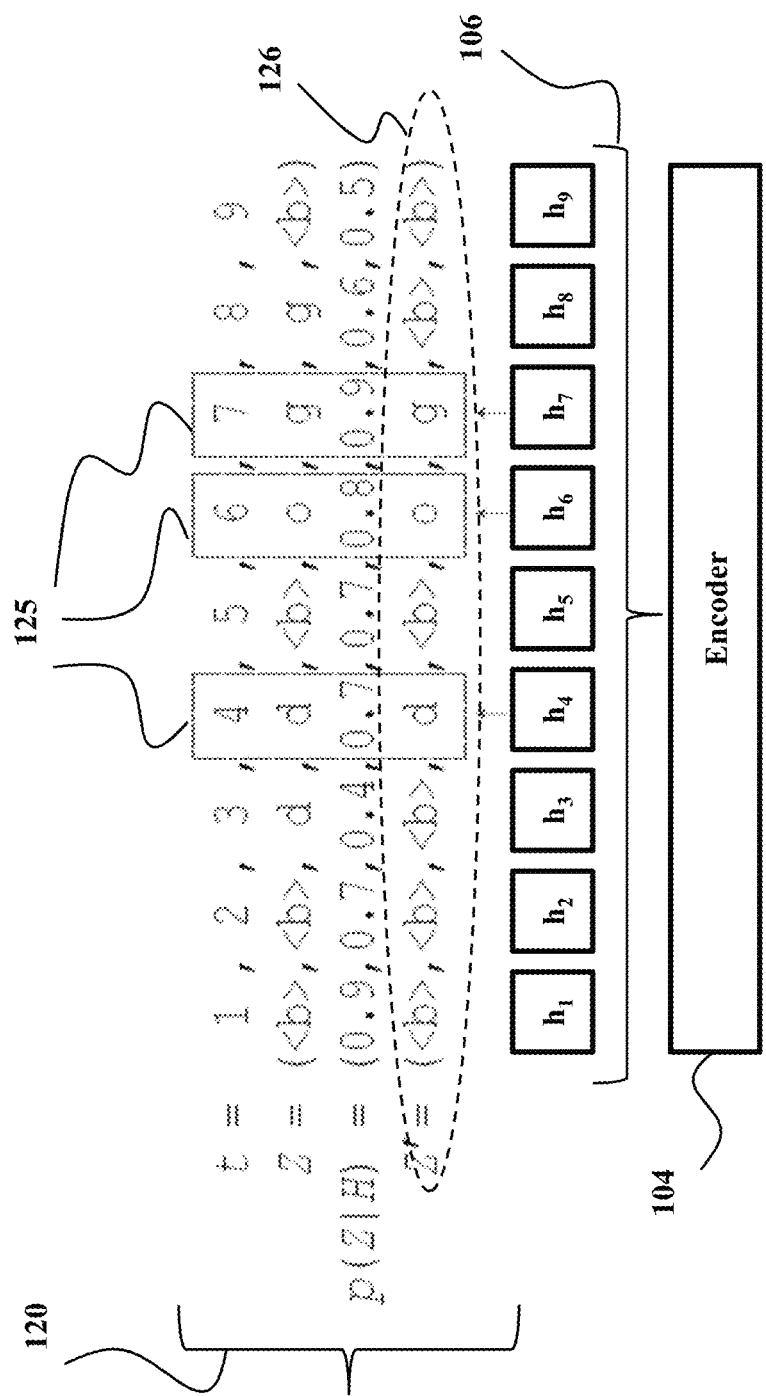
FIG. 2A shows a schematic of an alignment decoder according to some embodiments.

FIG. 2A shows a schematic of an alignment decoder 120 according to some embodiments. One of the objective of the alignment decoder 120 is to decoded a sequence of encoder states 106 produced by the encoder 104. To that end, the alignment decoder is trained to decode the sequence 106 to produce a sequence of transcription outputs 126. That is why the alignment decoder 120 is referred to in this disclosure as a decoder. However, at least some embodiments do not use the decoded transcription outputs of the alignment decoder. Instead, some embodiments use intermediate alignment information produced by the alignment decoder to decode the sequence of encoder states 106. In other words, some embodiments ignore the transcription outputs decoded by the alignment decoder, but use locations 125 of the encoder states in the sequence 106 to improve the performance of attention-based decoder 108. The rationale behind this approach is that a performance of attention-based decoder 108 may be better than the performance of the alignment decoder 120. To that end, the intermediate alignment information produced by the alignment decoder 120 is used to further improve the performance of the attention-based decoder 108.

In some embodiments, however, the transcription outputs 126 decoded by the alignment decoder 120 are further combined with the transcription outputs decoded by the attention-based decoder 108 to further improve accuracy of recognition. In these embodiments, the alignment decoder 120 is utilized twice: first time to assist partitioning the sequence of encoder states for the attention-based decoder 108 and second time for further improving the accuracy of transcription outputs decoded by the attention-based decoder 108.

FIG. 2A shows an example of operation of the alignment decoder to process an exemplar portion of an utterance with the word "dog". The boxes surrounding elements of indexed sequence identify locations of encoder states 125 that encode the transcription outputs in the sequence of encoder states 106. For example, the encoder 104 converts an input acoustic sequence X of acoustic features such as log-mel spectral energies into a T-encoder state sequence H: H=Encoder(X).

For example, in one implementation, the encoder output is sub-sampled to a four-times lower frame rate compared to the feature matrix X, which has a sampling rate of 100 Hz. Let $Z=(z_1, \ldots, z_T)$ denote a framewise sequence of encoder states 106 of T, with $z_t \in \mathcal{U} \cup \epsilon$, where $\mathcal{U}$ denotes a set of distinct graphemes that can either be single characters or word-pieces, for example, and $\epsilon$ the blank symbol. Let $C=(c_1, \ldots, c_L)$, with $c_l \in \mathcal{U}$, denote a grapheme sequence of length L, such that the sequence Z reduces to C when collapsing repeated labels into single occurrences and removing blank symbols.

In some embodiments, the alignment decoder decodes the sequence of encoder states probabilistically, with the probabilities derived as:

$$p_{ctc}(C|H) = \sum_Z p(C|Z, H)p(Z|H) \approx \sum_Z p(C|Z)p(Z|H) = \sum_Z p(Z|C)p(Z|H)\frac{p(C)}{p(Z)},$$

where p(Z|C) denotes the transition probability and p(Z|H) an acoustic model.

In some embodiments, the alignment decoder identifies the frame with highest probability within each sub-sequence of frames corresponding to the same grapheme in Z as an identified encoder state. For example, if the sequence Z is written using the indices $i_l$ and $j_l$ for the beginning and end of the occurrence of the l-th label $c_l$ in Z, with $i_l \leq j_l < i_{l+1}$, $\forall l$, and $z_t = c_l$ for all t such that $i_l \leq t \leq j_l$ and $z_t = \epsilon$ for all other indices. The alignment decoder performs a mapping from a sequence Z to a sequence including a subset of identified encoder states encoding the transcription outputs with highest probability 125 $Z'=(\epsilon^*, c_1, \epsilon^*, [0]c_2, \epsilon^*, \ldots, c_L, \epsilon^*)$ of same length T, in which * denotes zero or more repetitions and where each $c_l$ occurs exactly once, at the frame with maximum probability within those corresponding to $c_l$, as follows:

$$z'_t = \begin{cases} c_l & \text{if } t = \text{argmax}_{i_l \leq t' \leq j_l} p(z_{t'}|H), \text{ for some } l \in \{1, \ldots, L\}, \\ \langle b \rangle & \text{otherwise} \end{cases}.$$

Alternatively, the alignment decoder may identify the first or last frame within each sub-sequence of frames corresponding to the same grapheme in Z as an identified encoder state.

Figure 2B:
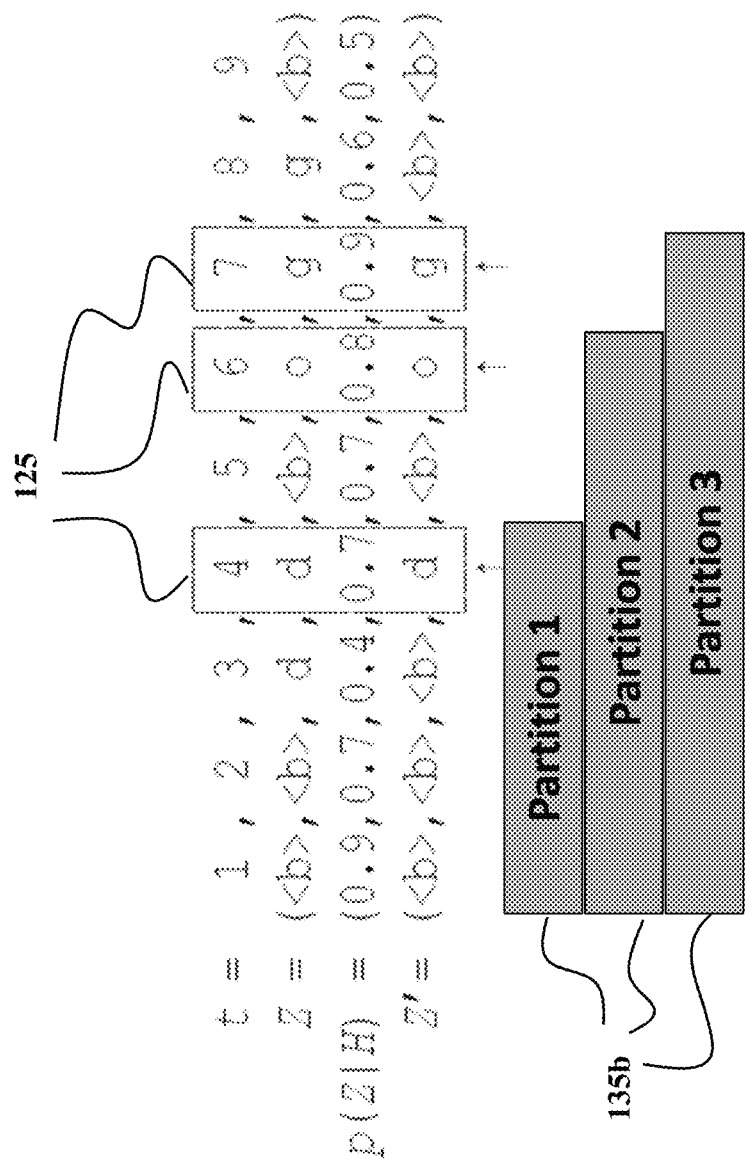
FIG. 2B and FIG. 2C show examples of partitioning the sequence of encoder states according to some embodiments.
Figure 2C:
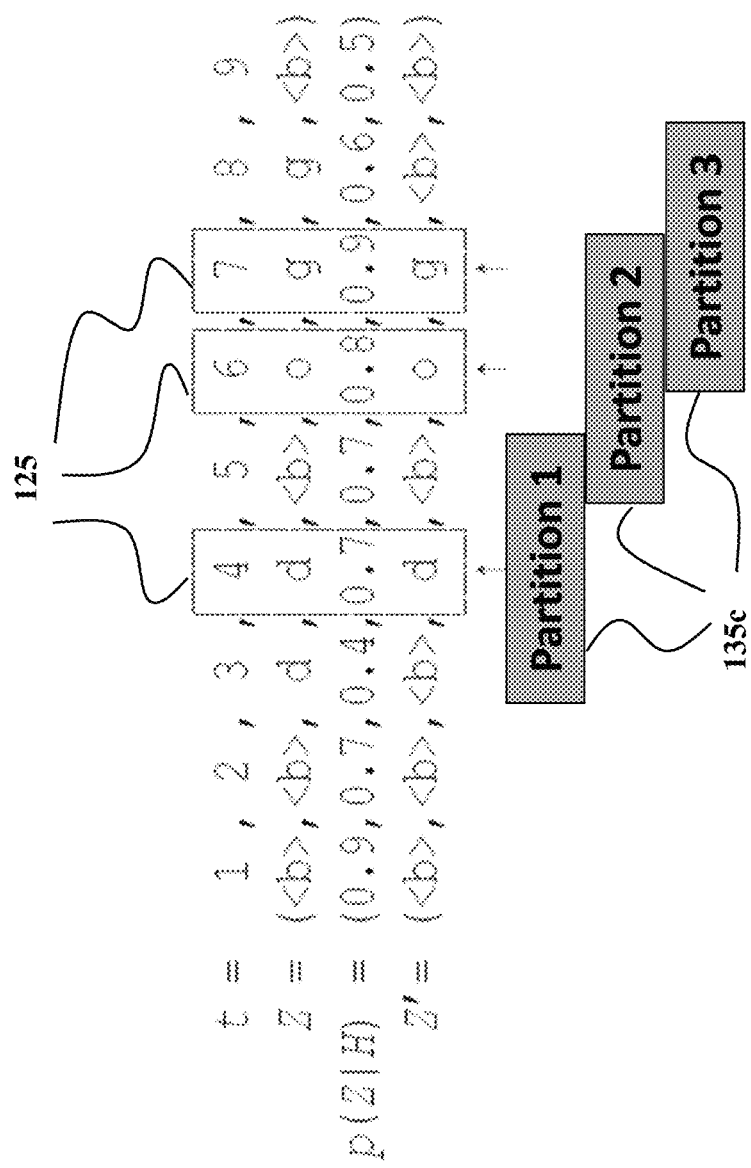

FIG. 2B and FIG. 2C show examples of partitioning the sequence of encoder states according to some embodiments. In various embodiments, the partitioning is performed by the partition module 130 operatively connected to the alignment decoder 120, the attention-based decoder 108, and the encoder 104. The partition module 130 is configured to access the alignment information 125 of the alignment decoder 120, partition the sequence of encoder states produced by the encoder 104, and submit sequentially the portions 135 of the sequence of encoder states to the attention-based decoder 108.

For example, in one embodiment of FIG. 2B, each partition 135*b* includes encoder states from the beginning of the sequence of encoder states until a look-ahead encoder state determined by shifting the location of the identified encoder state forward with a fixed shift. Example of a look-ahead encoder state 140 is shown in FIG. 1. For example, if a value of the fixed shift is 5, and a location of the identified state encoder is $8^{th}$ in the sequence of the encoder states, the partition 135*b* includes the first 13 encoder states. If a location of a subsequent identified encoder state is 11, the partition 135*b* includes the first 16 encoder states. In effect, each partition includes encoder states for new transcription outputs while increasing the length of partition allowing the attention-based decoder to exploit its length.

In alternative embodiment of FIG. 2C, a partition 135*c* corresponding to a location of an identified encoder state includes a predetermined number of encoder states centered on the location of the identified encoder state. For example, if the predetermined number of encoder states is 7 and the location of the identified encoder state is $15^{th}$ in the sequence of the encoder states, the partition 135*c* includes encoder states between $12^{th}$ and $18^{th}$ in the sequence of the encoder states 106. In effect, each partition includes encoder states for new transcription outputs while having a fixed length of partition to reduce the computational burden on the attention-based decoder. Additionally, or alternatively, a partition 135*c* corresponding to a location of an identified encoder state includes a predetermined number of encoder states around the location of the identified encoder state, e.g., shifted from the center to provide off-centered coverage.

Figure 3:
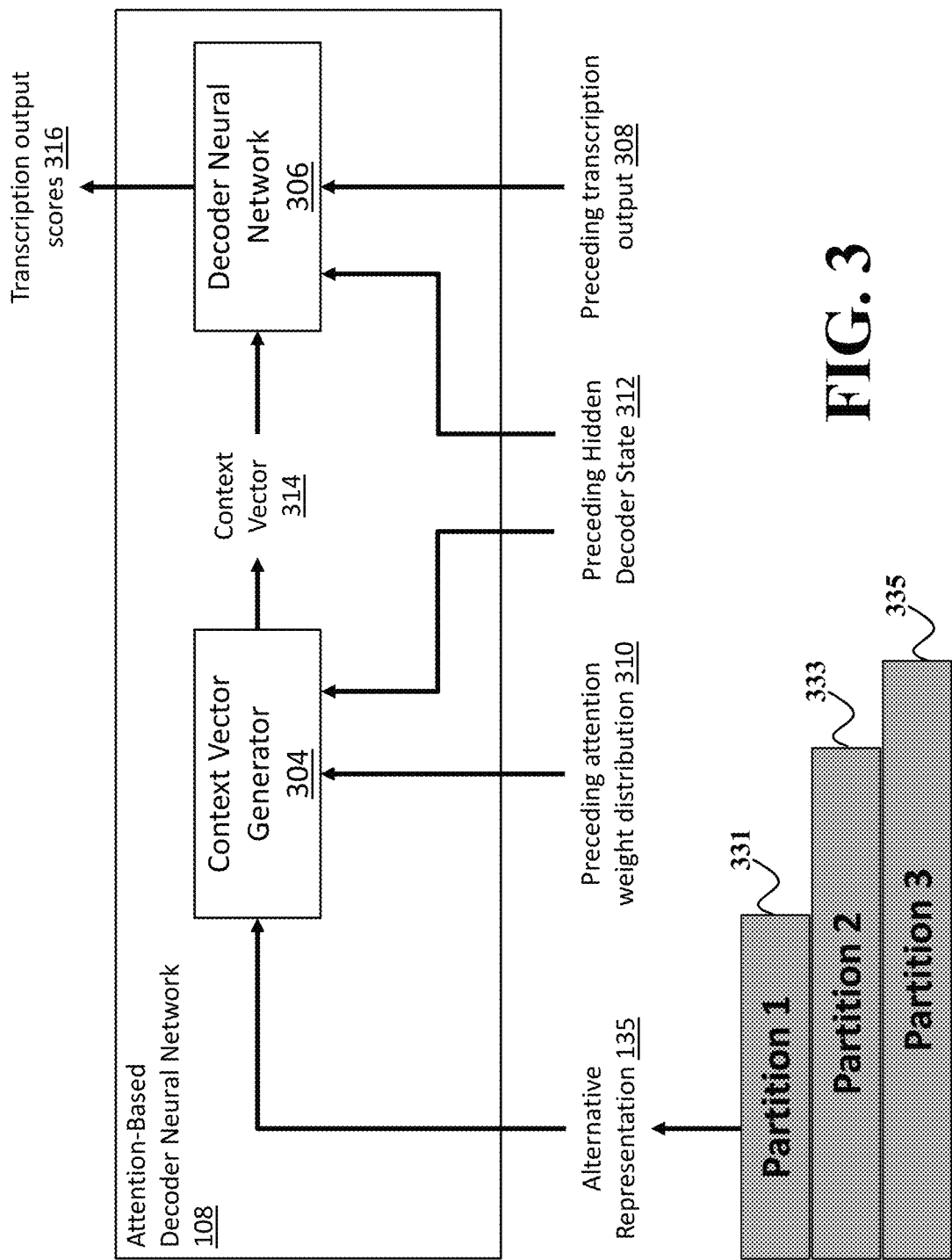
FIG. 3 shows an example of attention-based decoder according to some embodiments.

FIG. 3 shows an example attention-based decoder 108 according to some embodiments. The attention-based decoder 108 includes a context vector generator 304 and a decoder neural network 306. The context vector generator 304 receives as input the hidden decoder state 312 of the decoder neural network 306 from the preceding time step, the attention weight distribution 310 of the context vector generator from the preceding time step, and the alternative representation 106, i.e., the alternative representation of the acoustic signal 102 described above with reference to FIG. 1. The context vector generator 304 processes the preceding hidden decoder state of the decoder neural network 306, the preceding attention weight distribution 310, and the alternative representation 106 to compute an attention weight distribution over the time frames of the alternative representation 106 and to generate as output a context vector 314 for the time step. The context vector generator 304 provides the context vector 314 for the time step to the decoder neural network 306.

For different iterations, the attention-based decoder 108 receives different partitions 331, 333, and 335. For example, the set of partitions include a first partition 331 and subsequent partitions 333 and 335. The attention-based decoder 108 processes the first partition 331 to produce a first transcription output. After the attention-based neural network finished processing the first partition that places the attention-based network in its internal state, the attention-based decoder 108 processes the subsequent partitions with the attention-based network without resetting the internal state of the attention-based network to produce transcription outputs for the subsequent partitions one after another.

In effect, the attention-based decoder 108 processes different partitions without resetting an internal state of the attention-based network to take advantage of previously decoded information. Upon determining an end of the speech utterance, the attention-based decoder 108 is configured to reset its internal states.

The decoder neural network 306 receives as input the context vector 314 for the time step as well as the transcription output 308 and the hidden decoder state 312 of the preceding time step. The decoder neural network 306 initializes its internal hidden states with the preceding hidden decoder states 312 prior to processing the context vector 314 for the time step and the transcription output 308 from the preceding time step to generate as output a set of transcription output scores 316 for the time step. In some implementations, the decoder neural network 306 is a recurrent neural network (RNN) with a softmax output layer. Each transcription output score corresponds to a respective transcription output from a set of transcription outputs. For example, as described above with reference to FIG. 1, the set of transcription outputs may be a character or a sequence of characters from a Unicode character set which is used to write one or more natural languages, e.g., the alphabet of English, Asian, Cyrillic, and Arabic languages. The transcription output set may also include Arabic numerals, a space character, and punctuation marks. The score for a given transcription output represents a likelihood that the corresponding transcription output is the current transcription piece at the time step in an output sequence that is a transcription of the utterance.

The speech recognition system processes the transcription output scores 316 for each time step to determine a transcription output sequence that represents a transcription of an utterance. For example, for each time step, the speech recognition system may select the transcription output with the highest score from the set of transcription output scores to determine the transcription output sequence.

Figure 4:
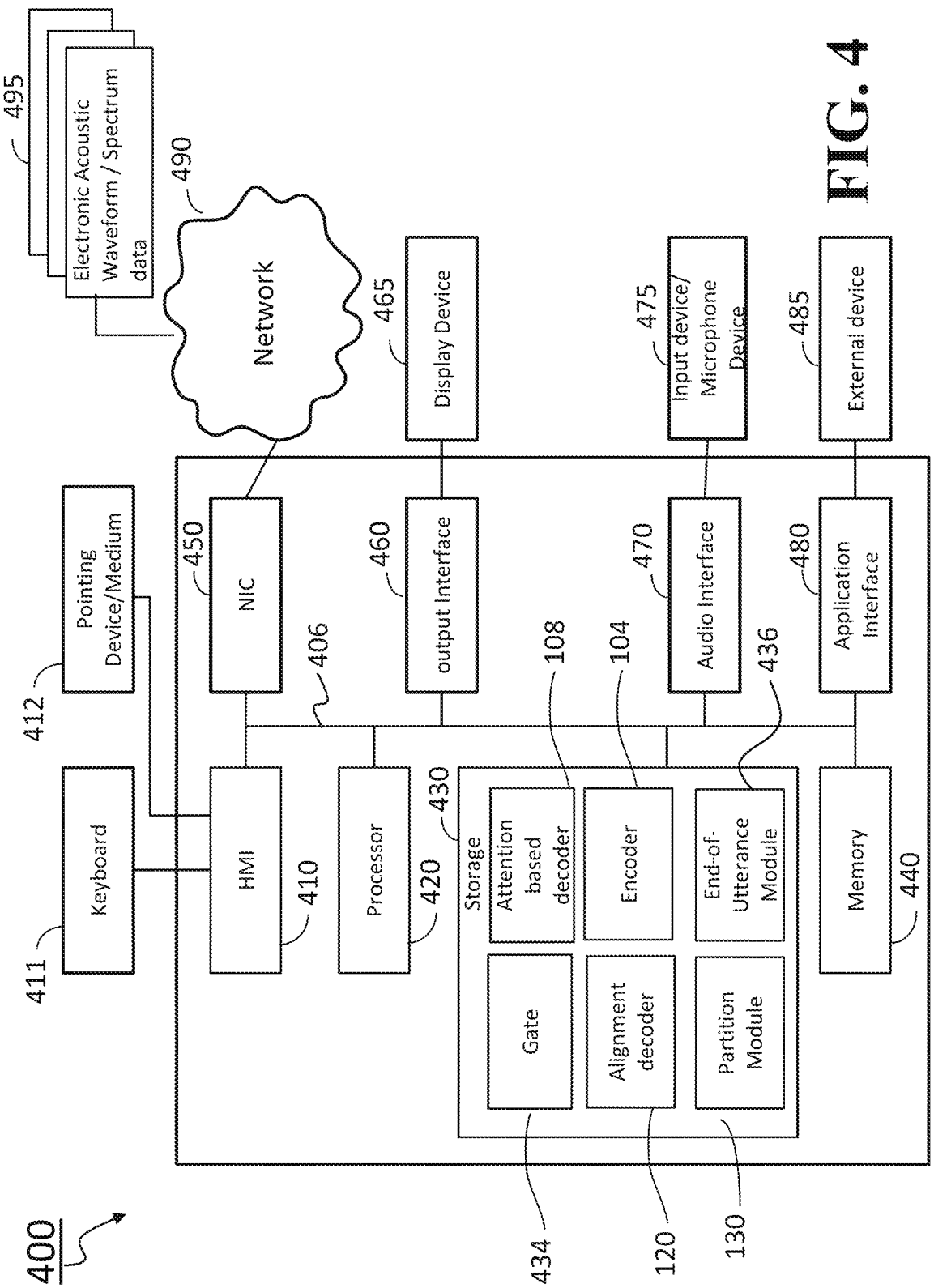
FIG. 4 shows a block diagram of a speech recognition system in accordance with some embodiments.

FIG. 4 shows a block diagram of a speech recognition system 400 in accordance with some embodiments. The speech recognition system 400 can have a number of interfaces connecting the system 400 with other systems and devices. A network interface controller 450 is adapted to connect the system 400 through the bus 406 to a network 490 connecting the speech recognition system 400 with sensing devices. For example, the speech recognition system 400 includes an audio interface 470 configured to accept input from acoustic input devices 475, such as a microphone. Through the input audio interface 470 the system 400 can accept an acoustic signal representing at least a portion of a speech utterance.

Additionally, or alternatively, the speech recognition system 400 can receive the acoustic signals from various other types of input interfaces. Examples of the input interface include a network interface controller (NIC) 450 configured to accept acoustic sequence 495 through the network 490, which can be one or combination of wired and wireless network. Additionally, or alternatively, the system 400 can include a human machine interface 410. The human machine interface 410 within the system 400 connects the system to a keyboard 411 and pointing device 412, wherein the pointing device 412 can include a mouse, trackball, touchpad, joy stick, pointing stick, stylus, or touchscreen, among others.

The speech recognition system 400 includes an output interface 460 configured to output the transcription outputs of the system 400. For example, the output interface 460 can display the transcription outputs on a display device 465, store the transcription outputs into storage medium and/or transmit the transcription outputs over the network. Examples of a display device 465 include a computer monitor, camera, television, projector, or mobile device, among others. The system 400 can also be connected to an application interface 480 adapted to connect the system to an external device 485 for performing various tasks.

The system 400 includes a processor 420 configured to execute stored instructions 430, as well as a memory 440 that stores instructions that are executable by the processor. The processor 420 can be a single core processor, a multi-core processor, a computing cluster, or any number of other configurations. The memory 440 can include random access memory (RAM), read only memory (ROM), flash memory, or any other suitable memory systems. The processor 420 can be connected through the bus 406 to one or more input and output devices.

The instructions 430 can implement a method for end-to-end speech recognition according to some embodiments. To that end, the computer memory 440 stores an encoder 104 trained to convert an input acoustic signal into a sequence of encoder states, an alignment decoder 120 trained to determine locations of encoder states in an input sequence of encoder states that encode transcription outputs, and an attention-based decoder 108 trained to determine the transcription outputs for each input subsequence of encoder states. In some embodiments, the outputs of the attention-based decoder 108 are the transcription outputs of the system 400. In some other embodiments, the outputs of the attention-based decoder 108 and the alignment decoder 120 are the transcription outputs of the system 400.

Upon accepting an acoustic sequence representing at least a portion of a speech utterance, the processor 420 is configured to submit the received acoustic sequence into the encoder network 104 to produce the sequence of encoder states, submit the sequence of encoder states produced by the encoder 104 into the alignment decoder 120 to identify locations of encoder states that encode the transcription outputs in the sequence of encoder states, execute the partition module 130 to partition the sequence of encoder states into a set of partitions based on the locations of the identified encoder states and submit the set of partitions sequentially into the attention-based decoder 108 to produce a transcription output for each of the submitted partitions.

The output interface, such as the interface 460, outputs the transcription outputs. For example, in one embodiment the output interface is configured to output each transcription output individually. For example, if a transcription output represents a character, the output interface outputs character by character. Similarly, if the transcription output represents a word, the output interface outputs word by word. Additionally, or alternatively, in one embodiment, the output interface is configured to accumulate a set of transcription outputs to form a word and output each word in the speech utterance individually. For example, the attention based decoder 108 can be configured to detect an end of word character, such that the output interface outputs the accumulated transcription outputs upon receiving the end of word character.

In some embodiments, the attention-based decoder 108 is configured to process different partitions without resetting an internal state of the attention-based network, wherein the processor, upon determining an end of the speech utterance, is configured to reset the internal state of the attention-based network. To that end, in some embodiments, the memory 440 also stores an end-of-utterance module 436 configured to detect the end of the speech utterance. Different embodiments use different techniques to implement the module 436. For example, some embodiments use a speech activity detection (SAD) module to detect the end of an utterance or a combination of SAD and an auxiliary end point detection system.

In some embodiments, the attention-based ASR system 100 is configured for recognition in a streaming/online fashion. For example, the memory 440 can include a gate 434 to partition the speech utterance into a set of acoustic sequences. For example, in some embodiments the gate is implemented as part of audio interface 470 partitioning the speech during its conversion. The length of each acoustic sequence in the set can be the same or can vary based on the features of the pronounced speech. In such a manner, the ASR system 100 transcribes input acoustic sequences in a streamline manner. In some embodiments, the gate partitions the speech utterance into blocks of acoustic signals, such that the input interface receives one block of acoustic signal at the time. For example, the gate can be implemented by a soundcard and a block processing can be defined by a clock of the soundcard, such that the audio received from a soundcard is block-wise sampled.

Figure 5:
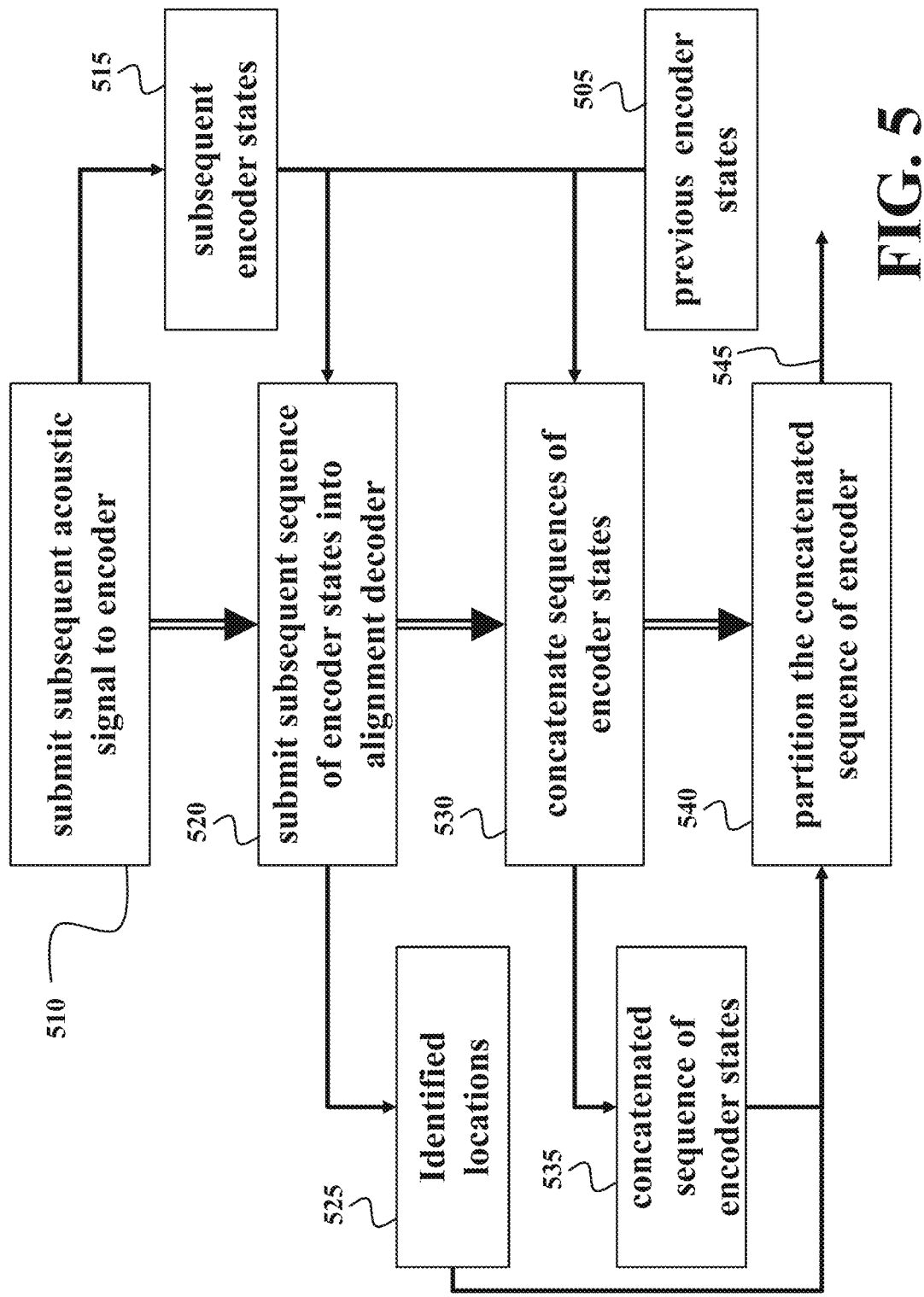
FIG. 5 shows a block diagram of a method executed by the ASR system upon receiving a subsequent acoustic signal representing a subsequent portion of the speech utterance in accordance with one embodiment.

FIG. 5 shows a block diagram of a method executed by the ASR system upon receiving a subsequent acoustic signal representing a subsequent portion of the speech utterance in accordance with one embodiment. The method submits 510 the subsequent acoustic signal into the encoder 104 to produce a subsequent sequence of the encoder states 515. The method submits 520 the subsequent sequence of the encoder states 515 into the alignment decoder 120 to identify locations 525 of encoder states that encode transcription outputs in the subsequent sequence of the encoder states. The method concatenates 530 the sequence of the encoder states 505 received from processing the previous acoustic signal with the subsequent sequence of the encoder states 515 to produce a concatenated sequence of encoder states 535. The method partitions 540 the concatenated sequence of encoder states 535 based on the locations 525 of the identified encoder states to update the sequence of partitions 545. In such a manner, the incoming acoustic signals are stitched together to implement the seamless online transcription.

In some implementations of the speech recognition system, the encoder, the alignment decoder, and the attention-based decoder are jointly trained neural networks. These embodiments take advantage of joint training in the cooperative manner of operation of the neural network to increase accuracy of speech recognition.

Figure 6:
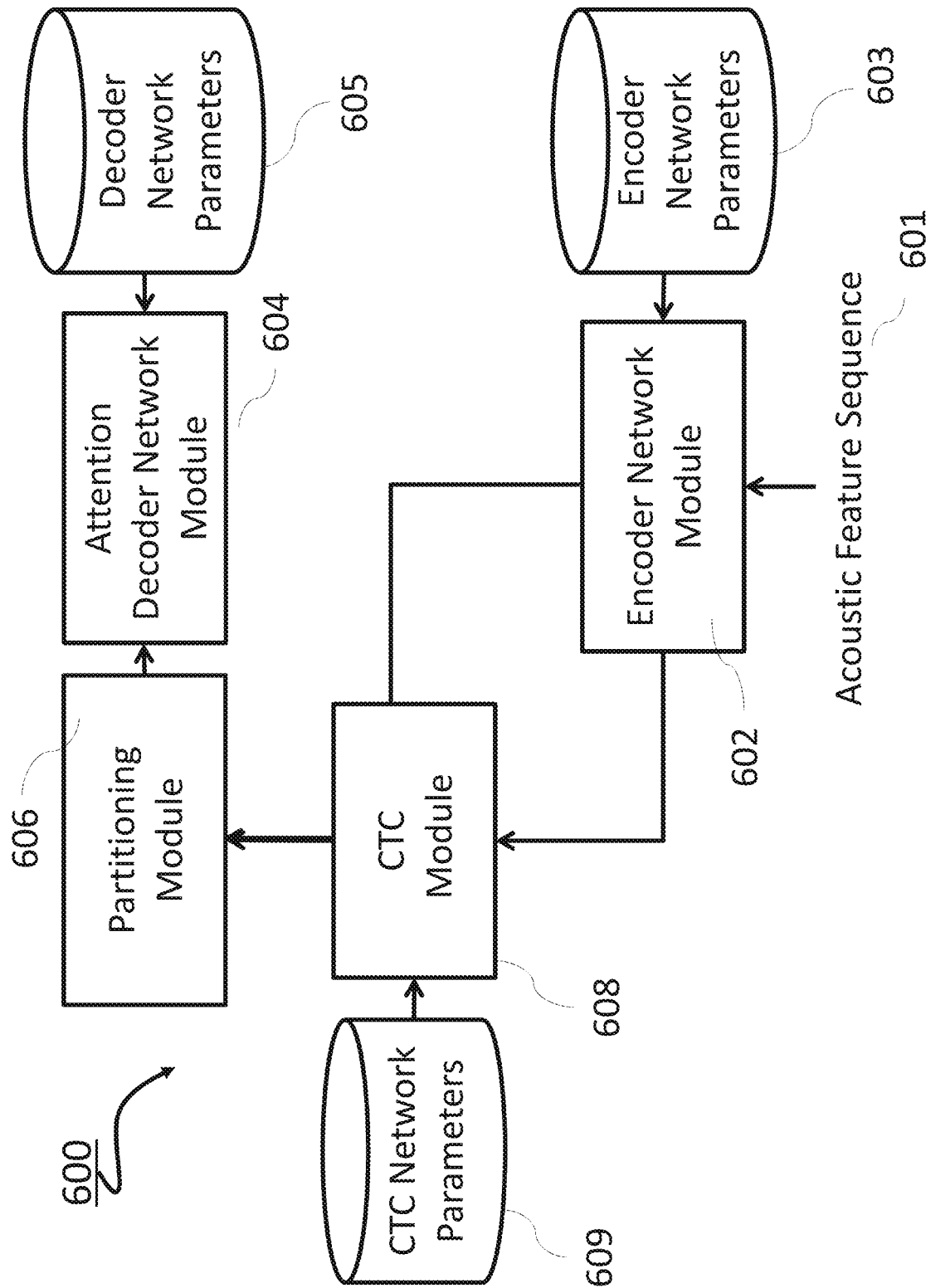
FIG. 6 shows a block diagram of a triggered attention neural network of an end-to-end speech recognition system according to one embodiment.

FIG. 6 shows a block diagram of a triggered attention neural network 600 of an end-to-end speech recognition system according to one embodiment. In this embodiment, the encoder, the alignment decoder, and the attention-based decoder are implemented as neural networks. For example, the alignment decoder 120 is a connectionist temporal classification based (CTC-based) neural network. To that end, the triggered neural network 600 includes an encoder network module 602, encoder network parameters 603, an attention decoder module 604, decoder network parameters 605, a partitioning module 606, a CTC module 608, and CTC network parameters 609. The encoder network parameters 603, the decoder network parameters 605, and the CTC network parameters 609 are respectively stored in a storage device to provide parameters to corresponding modules 602, 604, and 608. An acoustic feature sequence 601 is extracted from audio waveform data and may be stored in a storage device and provided to the encoder network module 602. The audio waveform data may be obtained via an input device using a digital signal processing module (not shown) receiving and processing speech sounds in the audio data.

The encoder network module 602 includes an encoder network that converts acoustic feature sequence 601 into an encoder feature vector sequence using the encoder network reading parameters from encoder network parameters 603. The CTC module 608 receives the hidden vector sequence from the encoder network module 602, and computes CTC-based posterior probability distributions of the label sequence using the CTC network parameters 609 and a dynamic programming technique. After the computation, the CTC module 608 provides the locations of most probable labels to the partitioning module 606.

An attention decoder network module 604 includes a decoder network. The attention decoder network module 604 receives partitions from the partitioning module 606, each partition including a portion of the encoder feature vector sequence, and then computes an attention-based posterior probability distribution of the label using the decoder network reading parameters from decoder network parameters 605.

End-to-end speech recognition is generally defined as a problem to find the most probable label sequence $\hat{Y}$ given input acoustic feature sequence X, i.e.

$$\hat{Y} = \underset{Y \in \mathcal{U}^*}{\arg\max}\, p(Y \mid X), \tag{1}$$

where $\mathcal{U}^*$ denotes a set of possible label sequences given a set of pre-defined letters $\mathcal{U}$.

In end-to-end speech recognition, p(Y|X) is computed by a pre-trained neural network without pronunciation lexicon and without a heavy WFST-based graph search. In the attention-based end-to-end speech recognition of a related art, the neural network consists of an encoder network and a decoder network.

An encoder module 602 includes an encoder network used to convert acoustic feature sequence $X=x_1, \ldots, x_T$ into hidden vector sequence $H=h_1, \ldots, h_T$ as $$H = \text{Encoder}(X), \tag{2}$$

where function Encoder(X) may include one or more recurrent neural networks (RNNs) and convolutional neural networks (CNN), which are stacked. An RNN may be implemented as a Long Short-Term Memory (LSTM), which has an input gate, a forget gate, an output gate and a memory cell in each hidden unit. Another RNN may be a bidirectional RNN (BRNN) or a bidirectional LSTM (BLSTM). A BLSTM is a pair of LSTM RNNs, one is a forward LSTM and the other is a backward LSTM. A Hidden vector of the BLSTM is obtained as a concatenation of hidden vectors of the forward and backward LSTMs.

With the forward LSTM, the forward t-th hidden vector $h_t^F$ is computed as $$h_t^F = o_t^F \odot \tan h(c_t^F) \tag{3}$$

$$o_t^F = \sigma(W_{xo}^F x_t + W_{xc}^F h_{t-1}^F + b_o^F) \tag{4}$$

$$c_t^F = f_t^F \odot c_{t-1}^F + i_t^F \odot \tan h(W_{xc}^F x_t + W_{hc}^F h_{t-1}^F + b_c^F) \tag{5}$$

$$f_t^F = \sigma(W_{xf}^F x_t + W_{hg}^F h_{t-1}^F + b_f^F) \tag{6}$$

$$i_t^F = \sigma(W_{xi}^F x_t + W_{hi}^F h_{t-1}^F + b_i^F). \tag{7}$$

where $\sigma(\cdot)$ is the element-wise sigmoid function, tan h(·) is the element-wise hyperbolic tangent function, and $i_t^F$, $f_t^F$, $o_t^F$ and $c_t^F$ are the input gate, forget gate, output gate, and cell activation vectors for $x_t$, respectively. $\odot$ denotes the element-wise multiplication between vectors. The weight matrices $W_{zz}^F$ and the bias vector $b_z^F$ are the parameters of the LSTM, which are identified by the subscript $z \in \{x, h, i, f, o, c\}$. For example, $W_{hi}^F$ is the hidden-to-input gate matrix and $W_{xo}^F$ is the input-to-output gate matrix. The hidden vector $h_t^F$ is obtained recursively from the input vector $x_t$ and the previous hidden vector $h_{t-1}^F$, where $h_0^F$ is assumed to be a zero vector.

With the backward LSTM, the backward t-th hidden vector $h_t^B$ is computed as $$h_t^B = o_t^B \odot \tan h(c_t^B) \tag{8}$$

$$o_t^B = \sigma(W_{xo}^B x_t + W_{xc}^B h_{t+1}^B + b_o^B) \tag{9}$$

$$c_t^B = f_t^B \odot c_{t+1}^B + i_t^B \odot \tan h(W_{xc}^B x_t + W_{hc}^B h_{t+1}^B + b_c^B) \tag{10}$$

$$f_t^B = \sigma(W_{xf}^B x_t + W_{hg}^B h_{t+1}^B + b_f^B) \tag{11}$$

$$i_t^B = \sigma(W_{xi}^B x_t + W_{hi}^B h_{t+1}^B + b_i^B). \tag{12}$$

where $i_t^B$, $f_t^B$, $o_t^B$ and $c_t^B$ are the input gate, forget gate, output gate, and cell activation vectors for $x_t$, respectively. The weight matrices $W_{zz}^B$ and the bias vector $b_z^B$ are the parameters of the LSTM, which are identified by the subscript in the same manner as the forward LSTM. The hidden vector $h_t^B$ is obtained recursively from the input vector $x_t$ and the succeeding hidden vector $h_{t+1}^B$, where $h_{T+1}^B$ is assumed to be a zero vector.

The hidden vector of the BLSTM is obtained by concatenating the forward and backward hidden vectors as $$h_t = [h_t^{F\tau}, h_t^{B\tau}]^\tau \tag{13}$$

where $\tau$ denotes the transpose operation for the vectors assuming all the vectors are column vectors. $W_{zz}^F$, $W_z^F$, and $b_z^B$ are considered the parameters of the BLSTM.

To obtain better hidden vectors, some implementations stack multiple BLSTMs by feeding the hidden vectors of the first BLSTM to the second BLSTM, then feeding the hidden vectors of the second BLSTM to the third BLSTM, and so on. If $h_t'$ is a hidden vector obtained by one BLSTM, we assume $x_t = h_t'$ when feeding it to another BLSTM. To reduce the computation, it may feed only every second hidden vectors of one BLSTM to another BLSTM. In this case, the length of output hidden vector sequence becomes the half of the length of input acoustic feature sequence.

An attention decoder module 604 includes a decoder network used to compute label sequence probability $p(Y|X)$ using hidden vector sequence H. Suppose Y is an L-length label sequence $y_1, y_2, \ldots, y_L$. To compute $p(Y|X)$ efficiently, the probability can be factorized by a probabilistic chain rule as $$p(Y|X) = \prod_{l=1}^{L} p(y_l | y_1, \ldots, y_{l-1}, X), \tag{14}$$

and each label probability $p(y_l|y_1, \ldots, y_{l-1}, X)$ is obtained from a probability distribution over labels, which is estimated using the decoder network as $$p(y|y_1, \ldots, y_{l-1}, X) = \text{Decoder}(r_l, q_{l-1}), \tag{15}$$

where y is a sequence of integers each representing a label, $r_l$ is called a content vector, which has content information of H. $q_{l-1}$ is a decoder state vector, which contains contextual information of the previous labels $y_1, \ldots, y_{l-1}$ and the previous content vectors $r_0, \ldots, r_{l-1}$. Accordingly, the label probability is obtained as the probability of $y = y_l$ given the context, i.e.

$$p(y_l|y_1, \ldots, y_{l-1}, X) = p(y = y_l|y_1, \ldots, y_{l-1}, X) \tag{16}$$

The content vector $r_l$ is usually given as a weighted sum of hidden vectors of the encoder network, i.e.

$$r_l = \sum_t a_{lt} h_t, \tag{17}$$

where $a_{lt}$ is called an attention weight that satisfies $\Sigma_t a_{lt} = 1$. The attention weights can be computed using $q_{l-1}$ and H as $$e_{lt} = w^T \tanh(W q_{l-1} + V h_t + U f_{lt} + b) \tag{18}$$

$$f_l = F * a_{l-1} \tag{19}$$

$$a_{lt} = \frac{\exp(e_{lt})}{\sum_{\tau=1}^{T} \exp(e_{l\tau})} \tag{20}$$

where W, V, F and U are matrices, and w and b are vectors, which are trainable parameters of the decoder network. $e_{lt}$ is a matching score between the (l−1)-th state vector $q_{l-1}$ and the t-th hidden vector $h_t$ to form a temporal alignment distribution $a_l = \{a_{lt} | t=1, \ldots, T\}$. $a_{l-1}$ represents the previous alignment distribution $\{a_{(l-1)t} | t=1, \ldots, T\}$ used for predicting the previous label $y_{l-1}$. $f_l = \{f_{lt} | t=1, \ldots, T\}$ is the convolution result with F for $a_{l-1}$, which is used to reflect the previous alignment to the current alignment. "*" denotes a convolution operation.

The label probability distribution is obtained with state vector $q_{l-1}$ and content vector $r_l$ as $$\text{Decoder}(r_l, q_{l-1}) = \text{softmax}(W_{qy} q_{l-1} + W_{ry} r_l + b_y), \tag{21}$$

where $W_{qy}$ and $W_{ry}$ are matrices and $b_y$ is a vector, which are trainable parameters of the decoder network. The softmax( ) function is computed as $$\text{softmax}(v) = \left. \frac{\exp(v[i])}{\sum_{j=1}^{K} \exp(v[j])} \right|_{i=1,\ldots,K} \tag{22}$$

for a K-dimensional vector v, where v[i] indicates the i-th element of v.

After that, decoder state vector $q_{l-1}$ is updated to $q_l$ using an LSTM as $$q_l = o_l^D \odot \tan h(c_l^D) \tag{23}$$

$$o_l^D = \sigma(W_{xo}^D x_l^D + W_{xc}^D q_{l-1} + b_o^D) \tag{24}$$

$$c_l^D = f_l^D \odot c_{l-1}^D + i_l^D \odot \tan h(W_{xc}^D x_l^D + W_{hc}^D q_{l-1} + b_c^D) \tag{25}$$

$$f_l^D = \sigma(W_{xf}^D x_l^D + W_{hg}^D q_{l-1} + b_f^D) \tag{26}$$

$$i_l^D = \sigma(W_{xi}^D x_l^D + W_{hi}^D q_{l-1} + b_i^D). \tag{27}$$

where $i_l^D$, $f_l^D$, $o_l^D$ and $c_l^D$ are the input gate, forget gate, output gate, and cell activation vectors for input vector $x_l$, respectively. The weight matrices $W_{zz}^D$ and the bias vector $b_z^D$ are the parameters of the LSTM, which are identified by the subscript in the same manner as the forward LSTM. The state vector $q_l$ is obtained recursively from the input vector $x_l^D$ and the previous state vector $q_{l-1}$, where $q_0$ is computed assuming $q_{-1} = 0$, $y_0 = \text{<sos>}$, and $a_0 = 1/T$. For the decoder network, the input vector $x_l^D$ is given as a concatenated vector of label $y_l$ and content vector $r_l$, which can be obtained as $x_l^D = [\text{Embed}(y_l)^\tau, r_l^\tau]^\tau$, where Embed(·) denotes label embedding, that converts a label into a fixed dimensional vector.

In attention-based speech recognition, estimating appropriate attention weights is very important to predict correct labels, since content vector $r_l$ is deeply dependent on alignment distribution $a_l$ as shown in Eq. (17). In speech recognition, the content vector represents acoustic information in the encoder's hidden vectors around the peak of the alignment distribution, and the acoustic information is the most important clue to predict label $y_l$. Nevertheless, the attention mechanism often provides irregular alignment distributions because there is no explicit constraint so that the peak of the distribution proceeds monotonically along time when incrementally predicting $y_l$. In speech recognition, the alignment between input sequence and output sequence should be monotonic in general. Although the convolution feature $f_{lt}$ alleviates generating irregular alignments, it cannot guarantee to avoid them.

The CTC module 608 computes a CTC forward probability of label sequence Y given hidden vector sequence H. Note that the CTC formulation uses L-length label sequence $Y=(y_1, \ldots, y_L)$ where $y_l \in \mathcal{U}$ and $\mathcal{U}$ is a set of distinct labels. By introducing the frame wise label sequence $Z=(z_1, \ldots, z_T)$ with $z_t \in \mathcal{U} \cup \{\epsilon\}$, where $\epsilon$ represents an additional blank label, and using the probabilistic chain rule and conditional independence assumption, the posterior distribution p(Y|X) is factorized as follows:

$$p(Y|X) \approx \sum_Z p(Y|Z)p(Z|X) \approx \qquad (28)$$

$$\sum_Z p(Y|Z) \prod_t p(z_t|X) \approx \sum_Z \prod_t p(z_t|z_{t-1},Y)p(z_t|X),$$

where $p(z_t|z_{t-1}, Y)$ is considered a label transition probability including blank labels. $p(z_t|X)$ is the framewise posterior distribution conditioned on the input sequence X, and modeled by using bidirectional long short-term memory (BLSTM):

$$p(z_t|X) = \text{softmax}(W_{hy}^{CTC} h_t + b_y^{CTC}), \qquad (29)$$

where $h_t$ is obtained with an encoder network. $W_{hy}^{CTC}$ is a matrix and $b_y^{CTC}$ is a vector, which are trainable parameters of CTC. Although Eq. (28) has to deal with a summation over all possible Z, it is efficiently computed by using the forward algorithm and dynamic programming The forward algorithm for CTC is performed as follows. Some implementations use an extended label sequence $Y'=y'_1, y'_2, \ldots, y'_{2L+1}=\epsilon, y_1, \epsilon, y_2, \ldots, \epsilon, y_L, \epsilon$ of length 2L+1, where a blank label $\epsilon$ is inserted between each pair of adjacent labels. Let $\alpha_t(s)$ be a forward probability, which represents the posterior probability of label sequence $y_1, \ldots, y_l$ for time frames $1, \ldots, t$, where s indicates the position in the extended label sequence Y'.
For initialization, we set $$\alpha_1(1)=p(z_1=\epsilon|X) \qquad (30)$$

$$\alpha_1(2)=p(z_1=y_1|X) \qquad (31)$$

$$\alpha_1(s)=0, \forall s>2. \qquad (32)$$

For t=2 to T, $\alpha_t(s)$ is computed recursively as $$\alpha_t(s) = \begin{cases} \bar{\alpha}_t(s)p(z_t=y'_s|X) & \text{if } y'_s=b \text{ or } y'_{s-2}=y'_s \\ (\bar{\alpha}_t(s)+\alpha_{t-1}(s-2))p(z_t=y'_s|X) & \text{otherwise} \end{cases}, \qquad (33)$$

where $$\bar{\alpha}_t(s)=\alpha_{t-1}(s)+\alpha_{t-1}(s-1). \qquad (34)$$

Finally, the CTC-based label sequence probability is obtained as $$p(Y|X)=\alpha_T(2L+1)+\alpha_T(2L). \qquad (35)$$

The framewise label sequence Z represents an alignment between input acoustic feature sequence X and output label sequence Y. When computing the forward probability, the recursion of Eq. (33) enforces Z to be monotonic and does not allow looping or big jumps of s in alignment Z, because the recursion to obtain $\alpha_t(s)$ only considers at most $\alpha_{t-1}(s)$, $\alpha_{t-1}(s-1)$, $\alpha_{t-1}(s-2)$. This means that when time frame proceeds one frame, the label changes from the previous label or blank, or keeps the same label. This constraint plays a role of the transition probability $p(z_t|z_{t-1}, Y)$ that enforces alignments to be monotonic. Hence, p(Y|X) can be 0 or a very small value when it is computed based on irregular (non-monotonic) alignments. The alignment between input acoustic feature sequence X and output label sequence Y is used by the partitioning module 606 to control the operation of the attention-based neural network 604.

Some embodiments are based on recognition that the accuracy of recognition can be further improved by combining decoder outputs from CTC and attention-based decoders. For example, in one implementation of the end-to-end speech recognition 600, CTC forward probabilities in Eq. (34) are combined with attention-based probabilities in Eq. (14) to obtain more accurate label sequence probabilities.

Figure 7:
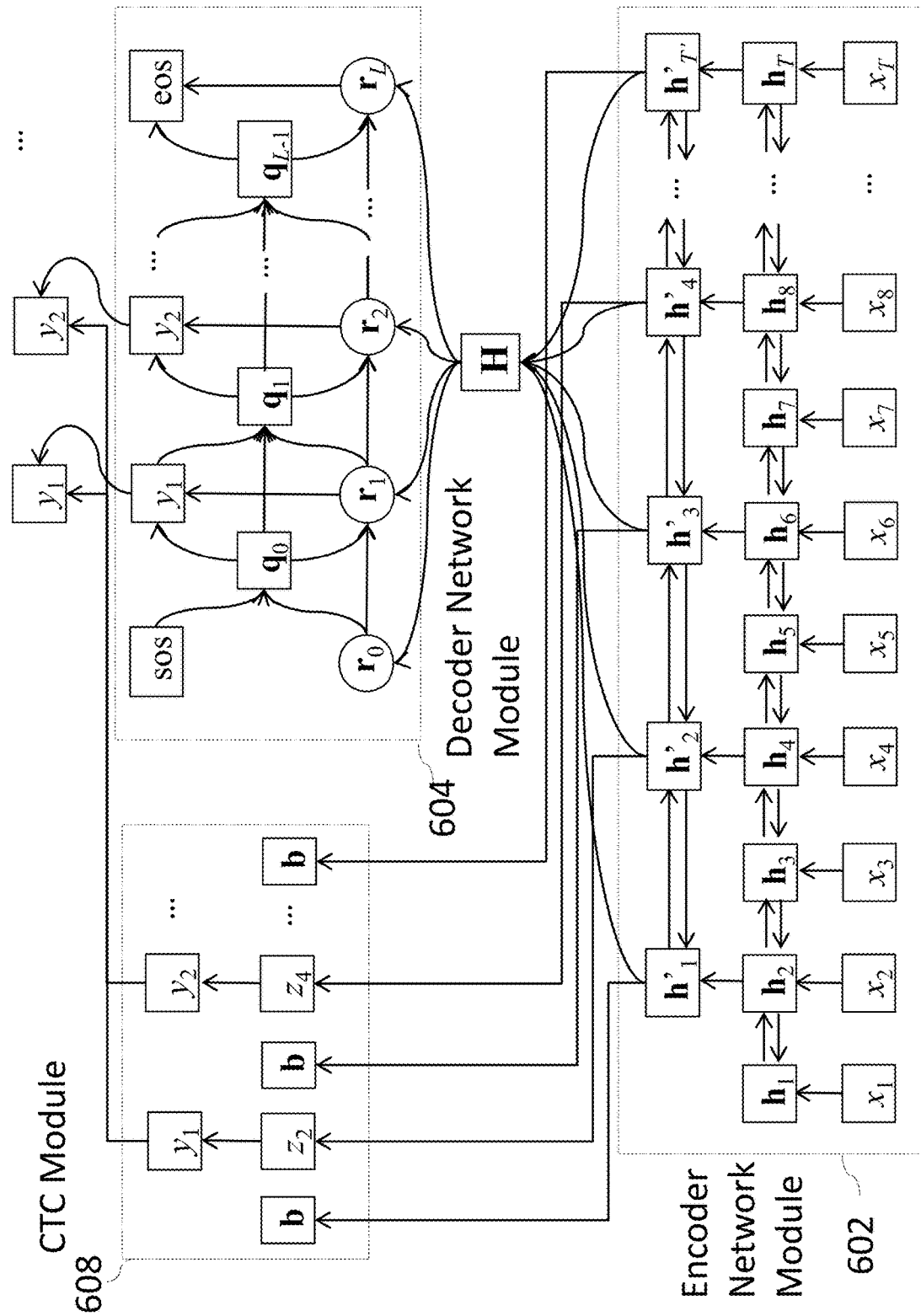
FIG. 7 is a schematic diagram illustrating a combined neural network according to some embodiments.

FIG. 7 is a schematic diagram illustrating a combined neural network according to some embodiments. The combined neural network includes an encoder network module 602, an attention decoder network module 604 and a CTC module 608. Each arrow represents a data transfer with or without transformation, and each square or circle node represents a vector or a predicted label. Acoustic feature sequence $X=x_1, \ldots, x_T$ is fed to the encoder network module 602, where two BLSTMs are stacked and every second hidden vectors of the first BLSTM are fed to the second BLSTM. The output of the encoder module 602 results in hidden vector sequence $H=h'_1, h'_2, \ldots, h'_{T'}$, where T'=T/2. Then, H is fed to the CTC module 608 and the decoder network module 604. The CTC-based and attention-based sequence probabilities are computed with the CTC module 608 and the decoder network module 604, respectively, and combined to obtain the label sequence probability.

In some embodiments, the probabilities can be combined in log domain as $$\log p(Y|X)=\lambda \log p_{ctc}(Y|X)+(1-\lambda)\log p_{att}(Y|X), \qquad (36)$$

where $p_{ctc}(Y|X)$ is the CTC-based label sequence probability in Eq. (35) and $p_{att}(Y|X)$ is the attention-based label sequence probability in Eq. (14). $\lambda$ is a scaling factor to balance CTC-based and attention-based probabilities.

Some embodiments perform a label sequence search to find the most probable label sequence $\hat{Y}$ according to label sequence probability distribution p(Y|X), i.e.

$$\hat{Y} = \mathop{\text{argmax}}_{Y \in \mathcal{U}^*} p(Y|X). \qquad (37)$$

In some attention-based speech recognition, p(Y|X) is $p_{att}(Y|X)$. In some embodiments, however, p(Y|X) is computed by a combination of label sequence probabilities as in Eq. (36), i.e. it finds $\hat{Y}$ according to $$\hat{Y} = \underset{Y \in U^*}{\mathrm{argmax}} \{\lambda \log p_{ctc}(Y|X) + (1-\lambda)\log p_{att}(Y|X)\}. \tag{38}$$

Some embodiments are based on recognition that it is difficult to enumerate all possible label sequences for Y and compute p(Y|X), because the number of possible label sequences increases exponentially to the length of the sequence. Therefore, a beam search technique is usually used to find $\hat{Y}$, a limited number of hypotheses, which have a higher score than others. Finally, the best label sequence hypothesis is selected from the completed hypotheses that reached an utterance end.

Figure 8:
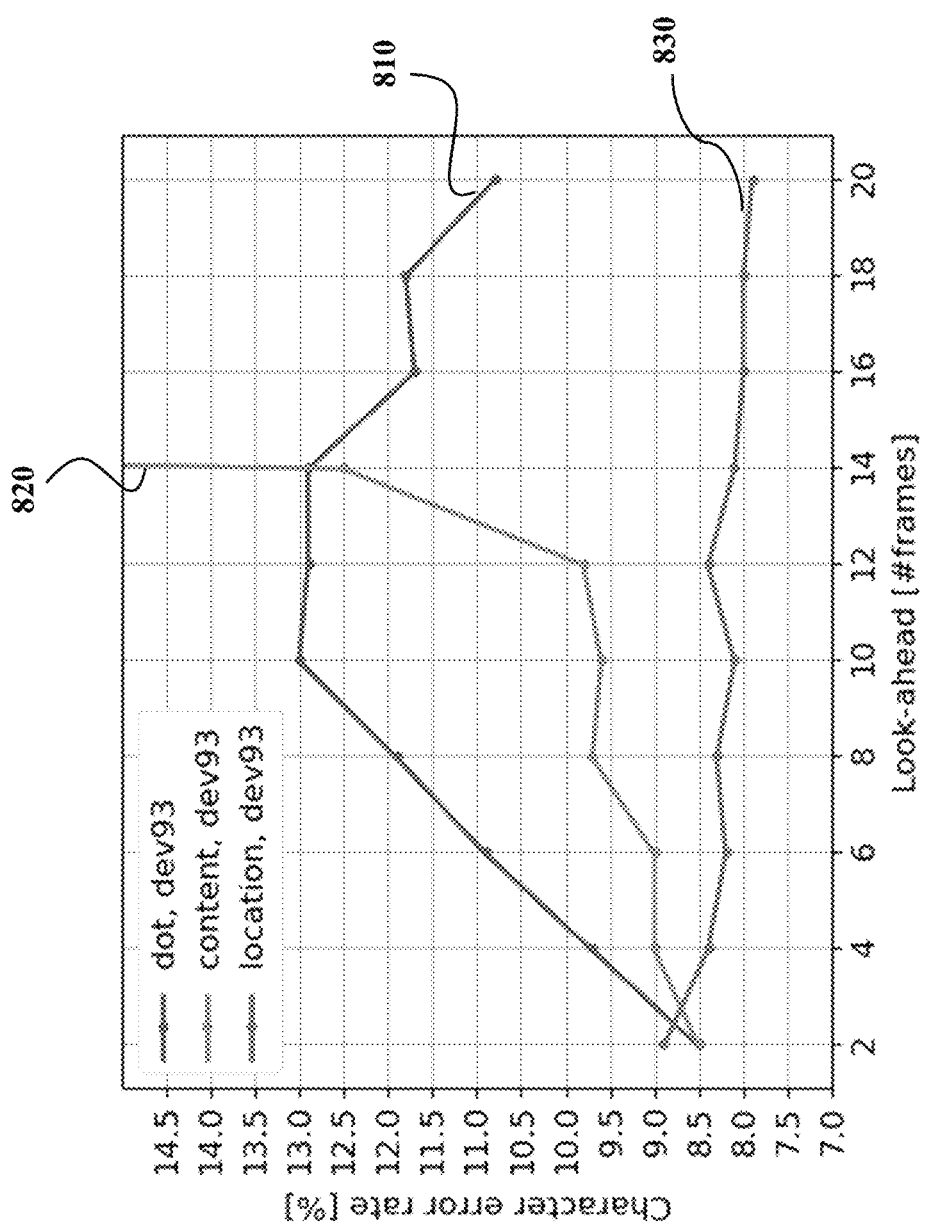
FIG. 8 shows a performance comparison diagram of speech recognition according to some embodiments.

FIG. 8 shows a performance comparison diagram of speech recognition according to some embodiments. Shown are the character error rates (CERs) of an end-to-end ASR system according to some embodiments to evaluate the influence of the look-ahead parameter 140 for three different attention mechanisms, which are the dot-product based attention 810, the content-based attention 820, and the location-aware attention 830, that are used to compute the context vector 314. However, the end-to-end ASR system according to some embodiments is not limited to these three attention mechanisms, which are to serve as examples only. The dot-product based attention 810, the content-based attention 320, as well as the location-aware attention 830 results show that, depending on the attention mechanism type, different look-ahead parameter settings may be favorable. For example, the location-aware attention type attains lower CERs for larger look-ahead values, while the dot-product based as well as the content-based attention tend to prefer smaller look-ahead values to attain low error rates, which also reduces the processing delay.

Figure 9:
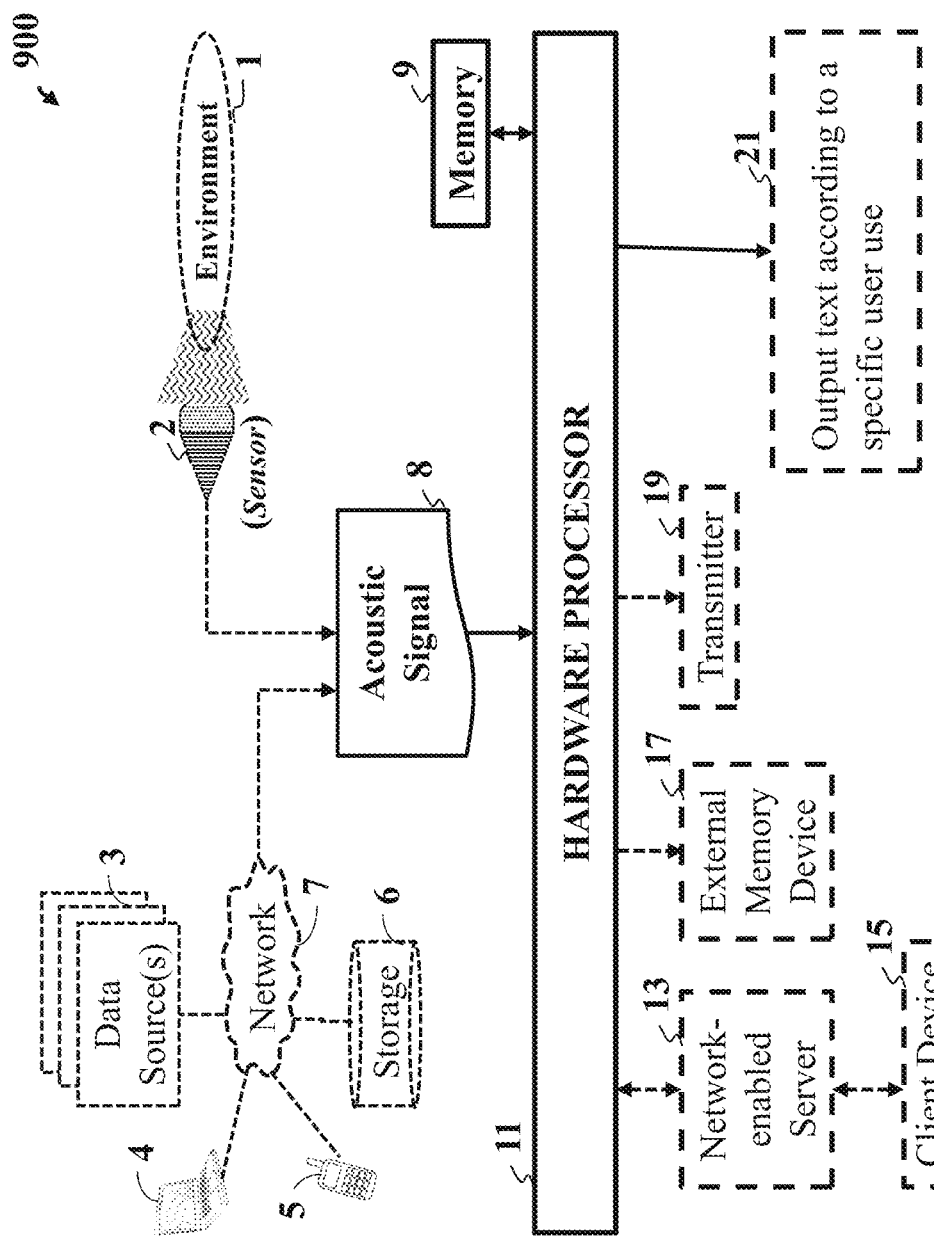
FIG. 9 is a block diagram illustrating some components that can be used in various configurations for implementing the systems and methods, according to some embodiments.

FIG. 9 is a block diagram illustrating some components that can be used in various configurations for implementing the systems and methods, according to some embodiments. For example, the components 900 can include the hardware processor 11 in communication with a sensor 2 or sensors, such as an acoustic sensor, that collects data including an acoustic signal(s) 8 from an environment 1. Further, the sensor 2 can convert an acoustic input into the acoustic signal The hardware processor 11 is in communication with a computer storage memory, i.e. memory 9, such that the memory 9 includes stored data, including algorithms, instructions and other data, that can be implemented by the hardware processor 11.

Optionally, the hardware processor 11 can be connected to a network 7, which is in communication with a data source(s) 3, computer device 4, a mobile phone device 5 and a storage device 6. Also optionally, the hardware processor 11 can be connected to a network-enabled server 13 connected to a client device 15. The hardware processor 11 can optionally be connected to an external memory device 17, and/or a transmitter 19. Further, the text of a speaker can be outputted according to a specific user intended use 21, for example, some types of user use can include displaying the text on one or more display device, such as a monitor or screen, or inputting the text of a speaker into a computer related device for further analysis, etc.

It is contemplated the hardware processor 11 can include one or more hardware processors depending upon the requirements of the specific application, wherein the processors can be either internal or external. Certainly, other components may be incorporated with components 900 including output interfaces and transceivers, among other devices.

It is possible the network 7 can include, by non-limiting example, one or more local area networks (LANs) and/or wide area networks (WANs). Wherein the networking environments can be similar to enterprise-wide computer networks, intranets and the Internet. Contemplated for all the components mentioned that there can be any number of client devices, storage components, and data sources employed with the components 900. Each may comprise a single device or multiple devices cooperating in a distributed environment. Further, the components 900 can include one or more data source(s) 3. Data source(s) 3 comprise data resources for training a speech recognition network. The data provided by data source(s) 3 may include labeled and un-labeled data, such as transcribed and un-transcribed data. For example, in an embodiment, the data includes one or more sounds and may also include corresponding transcription information or labels that may be used for initializing a speech recognition network.

Further, un-labeled data in data source(s) 3 can be provided by one or more feedback loops. For example, usage data from spoken search queries performed on search engines can be provided as un-transcribed data. Other examples of data sources may include by way of example, and not limitation, various spoken-language audio or image sources including streaming sounds or video, web queries, mobile device camera or audio information, web cam feeds, smart-glasses and smart-watch feeds, customer care systems, security camera feeds, web documents, catalogs, user feeds, SMS logs, instant messaging logs, spoken-word transcripts, gaining system user interactions such as voice commands or captured images (e.g., depth camera images), tweets, chat or video-call records, or social-networking media. Specific data source(s) 3 used may be determined based on the application including whether the data is a certain class of data (e.g., data only related to specific types of sounds, including machine systems, entertainment systems, for example) or general (non-class-specific) in nature.

The components 900 can include or be connected to third party devices 4, 5, which can comprise of any type of computing device, such that there may be interest to have an automatic speech recognition (ASR) system on the computing device. For example, the third party devices may include a computer device 4 or a mobile device 5. Contemplated is that a user device may be embodied as a personal data assistant (PDA), a mobile device, such as a smartphone, smart watch, smart glasses (or other wearable smart device), augmented reality headset, virtual reality headset. Further, the user device could be a laptop, such as a tablet, remote control, entertainment system, vehicle computer system, embedded system controller, appliance, home computer system, security system, consumer electronic device, or other similar electronics device. In one embodiment, the client device is capable of receiving input data such as audio and image information usable by an ASR system described herein that is operating on the device. For example, the third party device may have a microphone or line-in for receiving audio information, a camera for receiving video or image information, or a communication component (e.g., Wi-Fi functionality) for receiving such information from another source, such as the Internet or a data source 3.

The ASR model using a speech recognition network can process the inputted data to determine computer-usable information. For example, a query spoken by a user into a microphone may be processed to determine the content of the query, for example, if a question is asked. Example third party devices 4, 5 are optionally included in the components 900 to illustrate an environment that the deep neural network model may be deployed. Further, some embodiments of the present disclosure may not include third party devices 4, 5. For example, a deep neural network model can be on a server or in a cloud network, system or like arrangement.

Regarding the storage 6, the storage 6 can store information including data, computer instructions (e.g., software program instructions, routines, or services), and/or models used in embodiments of the technology described herein. For example, the storage 6 can store data from one or more data source(s) 3, one or more deep neural network models, information for generating and training deep neural network models, and the computer-usable information outputted by one or more deep neural network models.

Embodiments

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A speech recognition system, comprising:
a computer memory configured to store an executable code defining modules of the speech recognition system including
an encoder configured to convert an input acoustic signal into a sequence of encoder states;
an alignment decoder configured to decode the encoder states to identify locations of encoder states in the sequence of encoder states that encode transcription outputs;
a partition module configured to partition the sequence of encoder states into a set of partitions based on the locations of the identified encoder states; and
an attention-based decoder configured to determine the transcription outputs for each partition of encoder states submitted to the attention-based decoder as an input;
an input interface configured to receive the acoustic signal representing at least a portion of a speech utterance;
a hardware processor configured to
submit the received acoustic signal to the encoder to produce the sequence of encoder states;
submit the sequence of encoder states into the alignment decoder to identify locations of the encoder states that encode the transcription outputs; partition the sequence of encoder states, using the partition module, into the set of partitions based on the locations of the identified encoder states, wherein, in response to the alignment decoder identifying a next new location in the sequence of encoder states, the partition module forms a partition by extracting a portion of the sequence of encoder states as a function of the new location; and
submit each partition from the set of partitions sequentially into the attention-based decoder to produce a transcription output for each of the submitted partitions, herein the processor executes the attention-based decoder multiple times, once for each partition; and
an output interface configured to output the transcription outputs.

2. The speech recognition system of claim 1, wherein the output interface is configured to output each transcription output individually as they are transcribed.

3. The speech recognition system of claim 1, wherein the output interface is configured to accumulate a set of transcription outputs to form a word and output each word individually.

4. The speech recognition system of claim 1, wherein the processor partitions the sequence of encoder states for each location of the identified frames, such that the number of partitions is defined by the number of identified encoder states.

5. The speech recognition system of claim 4, wherein each partition includes encoder states from the beginning of the sequence of encoder states until a look-ahead encoder state determined by shifting the location of the identified encoder state forward with a fixed shift.

6. The speech recognition system of claim 4, wherein each partition corresponding to a location of an identified encoder state includes a predetermined number of encoder states around the location of the identified encoder state.

7. The speech recognition system of claim 1, wherein the set of partitions includes a first partition and subsequent partitions, wherein the processor processes the first partition with the attention-based decoder to produce a first transcription output, wherein after the attention-based decoder finishes processing the first partition that places the attention-based decoder in its internal state, the processor processes the subsequent partitions with the attention-based decoder without resetting the internal state of the attention-based decoder to produce transcription outputs for the subsequent partitions one after another.

8. The speech recognition system of claim 1, wherein the attention-based decoder is configured to process different partitions without resetting an internal state of the attention-based decoder, wherein the processor, upon determining an end of the speech utterance, is configured to reset the internal state of the attention-based decoder.

9. The speech recognition system of claim 1, wherein the processor, upon receiving a subsequent acoustic signal representing a subsequent portion of the speech utterance, is configured to
submit the subsequent acoustic signal to the encoder to produce a subsequent sequence of the encoder states;
submit the subsequent sequence of the encoder states to the alignment decoder to identify locations of encoder states that encode transcription outputs in the subsequent sequence of the encoder states;

concatenate the sequence of the encoder states and the subsequent sequence of the encoder states to produce a concatenated sequence of encoder states; and partition the concatenated sequence of encoder states based on the locations of the identified encoder states to update the sequence of partitions.

10. The speech recognition system of claim 9, further comprising:

a gate to partition the speech utterance into blocks of acoustic signals, such that the input interface receives one block of acoustic signal at a time.

11. The speech recognition system of claim 1, wherein the encoder, the alignment decoder, and the attention-based decoder are jointly trained neural networks.

12. The speech recognition system of claim 11, wherein the alignment decoder includes a connectionist temporal classification (CTC) based neural network or a hidden Markov model (HMM) based classifier.

13. The speech recognition system of claim 11, wherein the alignment decoder is a connectionist temporal classification based (CTC-based) neural network, wherein the attention-based decoder is an attention-based neural network, wherein the transcription outputs determined by the attention-based neural network include probabilities of transcription outputs, wherein the CTC-based neural network is further trained to determine probabilities of transcription outputs in the encoder states provided to the CTC-based neural network as the input, wherein the processor by submitting the sequence of encoder states into the CTC-based neural network determines a first sequence of probabilities of transcription outputs in the acoustic signal, wherein the processor by submitting the partitions of the sequence of encoder states into the attention-based neural network determines a second sequence of probabilities of transcription outputs in the acoustic signal, wherein the processor is configured to determine the transcription outputs in the acoustic signal based on a combination of the first and the second sequences of probabilities of transcription outputs.

14. A speech recognition method, wherein the method uses a processor coupled with stored instructions implementing the method, wherein the instructions, when executed by the processor carry out steps of the method, comprising:

receiving an acoustic signal representing at least a portion of a speech utterance;

converting the acoustic signal into a sequence of encoder states;

decoding the sequence of encoder states to identify locations of encoder states in the sequence of encoder states that encode transcription outputs;

partitioning the sequence of encoder states into a set of partitions based on the locations of the identified encoder states, wherein, in response to identifying a next new location in the sequence of encoder states, a partition is formed by extracting a portion of the sequence of encoder states as a function of the new location;

submitting the set of partitions sequentially into an attention-based decoder by executing the attention-based decoder multiple times, once for each partition, to produce a transcription output for each of the submitted partitions; and outputting the transcription outputs.

15. A non-transitory computer-readable storage medium embodied thereon a program executable by a processor for performing a method, the method comprising:

receiving an acoustic signal representing at least a portion of a speech utterance;

converting the acoustic signal into a sequence of encoder states;

decoding the sequence of encoder states to identify locations of encoder states in the sequence of encoder states that encode transcription outputs;

partitioning the sequence of encoder states into a set of partitions based on the locations of the identified encoder states, wherein, in response to identifying a next new location in the sequence of encoder states, a partition is formed by extracting a portion of the sequence of encoder states as a function of the new location;

submitting the set of partitions sequentially into an attention-based decoder by executing the attention-based decoder multiple times, once for each partition, to produce a transcription output for each of the submitted partitions; and outputting the transcription outputs.

* * * * *